2,782,114

MELTING OF HIGH MELTING POINT METALS OR ALLOYS

Jack Preston, Birmingham, England, assignor to Imperial Chemical Industries Limited, London, England, a corporation of Great Britain No Drawing. Application December 14, 1954,
Serial No. 475,277

Claims priority, application Great Britain December 18, 1953

10 Claims. (Cl. 75—10)

This invention relates to an improved process and apparatus for use in the arc-melting of high melting point reactive metals and alloys, such for example as titanium, zirconium, molybdenum, thorium, hafnium, tantalum, chromium and their alloys.

In one method for the continuous arc-melting of such metals and alloys in a cooled crucible, the raw material to be melted is fed to the crucible in the form of a consumable electrode introduced from above, with or without an additional feed of raw material in for example sponge or powder form into the crucible. An arc is struck between this electrode and an initial small charge of the metal in the crucible and subsequently maintained between the electrode and the surface of the molten metal, to provide the heat required for progressive melting of the electrode material.

The consumable electrode can be formed from the material to be melted in various ways, one method employed at present being to compact the material in sponge, powder or other form into preformed blocks of the required cross-section by a pressing operation. Fairly high pressures are required for this, with consequent die wear.

The object of the present invention is to provide an improved method of manufacturing such consumable electrodes and their application in arc-melting furnaces.

According to the present invention we provide a method of manufacture of a consumable electrode for use in the arc-melting of high melting point reactive metals and alloys which comprises feeding the raw material in sponge, pellet or other suitably divided form to the melting chamber of an arc-melting furnace at a higher rate than that consistent with complete melting of the raw material over the whole cross-section of the melting chamber, whereby a coherent but incompletely melted mass of metal or alloy is built up. Thus a mass of metal or alloy may be built up which is fully or partially fused in the central portion and only partially fused or sintered in the peripheral portion.

The invention further comprises a method of arc-melting high melting point reactive metals and alloys which comprises the use of the so-obtained mass as a consumable electrode to be progressively melted in an arc-melting furnace, having a melting chamber of greater cross-section than that of the said mass, with or without an additional feed of raw material into the melting chamber.

This method has as an advantage that the preliminary partial melting effects the removal to a considerable extent of the volatile impurities present in the raw material, such as magnesium chloride or sodium chloride in the case of titanium, and by this means assists in obtaining a better surface quality in the final ingot.

In the manufacture of the consumable electrode, the furnace electrode may be of the permanent type, e. g. tungsten or graphite, or may consist of a consumable electrode formed from the metal to be melted. For example a 200 lb. titanium consumable electrode was made by feeding into a 10 inch diameter crucible 150 lb. of titanium sponge in 12½ minutes and using 50 lb. of 6 inch diameter titanium electrode to consolidate this material.

In one embodiment of the invention the process may be operated as a continuous process by manufacture of the consumable electrode in a chamber immediately adjacent the main melting furnace in such manner that a continuous supply of electrodes or electrode material is available for use in the main furnace. For example the raw material may be continuously consolidated in the manner in accordance with the invention in an open-ended melting chamber in a small arc furnace located above the main furnace and the product passed downwardly, for example by means of driven feed rolls, into the main furnace to function as a consumable electrode therein. Additional raw material in sponge or other suitable form may be supplied to the melting chamber of the main furnace; in this manner a fully melted ingot of any desired size may be built up, or the process may be operated for the continuous production of an indefinite length of ingot.

In a second embodiment of the invention, the consumable electrode may be manufactured in a furnace designed solely for this purpose and then transferred to the main furnace. The so-formed electrode may be attached to a rod of copper or like material of high electrical conductivity and the electrode melted from the end of this rod in the main furnace, in this way permitting the use of simpler feeding and contact gear than would be required for an electrode consisting wholly of the metal to be melted. For example the 200 lb. 10 inch diameter titanium electrode prepared as hereinbefore described was secured to a copper bar and then melted off together with an additional feed of 200 lb. sponge into a 12 inch diameter crucible, thus providing a final ingot of 400 lb. weight.

In a third embodiment of the invention the same main structure of the furnace is used, but crucibles of different diameter are employed successively for the electrode manufacture and the subsequent ingot melting. Thus for example the partially fused ingot that is to be used as the subsequent electrode is first formed, the graphite or tungsten tip of the electrode used in its formation removed and the ingot secured by suitable means to the electrode stem. The crucible is then removed and replaced by a crucible of larger diameter into which the ingot is finally melted with the addition of further raw material in sponge or other suitable form.

I claim:

1. Method of manufacture of a consumable electrode for use in the arc melting of high melting point reactive metals and alloys which comprises introducing a particulate raw material selected from the group consisting of said high melting point reactive metals and alloys into the melting chamber of an arc melting furnace, fusing the central portion of said particulate raw material and sintering the remainder of said raw material, said fusing and sintering occurring simultaneously from the heat of an electrode arc.

2. Method in accordance with claim 1 wherein said simultaneous fusing and sintering is accomplished by introducing said particulate material into the melting chamber at a rate of feed which is in excess of the rate of total fusion.

3. Method of manufacture of a consumable electrode for use in the arc melting of high melting point reactive metals and alloys which comprises introducing a particulate raw material selected from the group consisting of said high melting point reactive metals and alloys, into the melting chamber of an arc melting furnace, creating an arc between said raw material and the furnace electrode to generate heat, fusing the central portion of said raw material and sintering the remainder of said raw material, said fusing and sintering occurring simultaneously from the heat of the electrode arc.

4. In a method of manufacturing a consumable electrode as defined in claim 3, the step of fusing the furnace electrode whereby the furnace electrode melts and commingles with said raw material during formation of the consumable electrode.

5. Process of arc melting high melting point reactive metals and alloys which comprises introducing a particulate raw material selected from the group consisting of said high melting point reactive metals and alloys, into a first melting chamber of an arc melting furnace, fusing the central portion of said particulate raw material and sintering the remainder of said raw material, said fusing and sintering occurring simultaneously from the heat of an electric arc, continuing the introduction, fusion and sintering of said raw material so that the resultant conglomerate gradually fills the first melting chamber to form an elongated consumable electrode, progressively introducing the consumable electrode into a second melting chamber and completely fusing the electrode as it is introduced into said second melting chamber.

6. The process of claim 5 wherein additional particulate material is added during fusing in the second melting chamber.

7. The process defined in claim 5 including the step of feeding the elongated conglomerate directly through the bottom of the first melting chamber into the second melting chamber.

8. Process of arc melting high melting point reactive metals and alloys which comprises attaching a rod of high electrical conductivity to the end of a consumable electrode constructed of a material selected from the group consisting of high melting point reactive metals and alloys, the highly conductive rod constituting a longitudinal extension of the consumable electrode, and passing an electrical current through the highly conductive rod and into said material whereby said material is completely fused.

9. Process of arc melting high melting point reactive metals and alloys which comprises introducing particulate raw material selected from the group consisting of high melting point reactive metals and alloys into a crucible in the melting chamber of an arc melting furnace, forming the particulate raw material into an elongated body, removing the crucible from the elongated body after solidification thereof and placing a second larger crucible about the body, and applying heat to the body to fuse it into an integral unit having a cross-sectional configuration like that of the second crucible.

10. A generally elongated consumable electrode for use in the arc melting of a material selected from the group consisting of high melting point reactive metals and alloys comprising a fused central portion of said material and a sintered portion of said material extending from said central portion outwardly to and including the outer surfaces of the electrode.

References Cited in the file of this patent

UNITED STATES PATENTS

| 2,541,764 | Herres et al. | Feb. 13, 1951 |
| 2,548,897 | Kroll | Apr. 17 1951 |
| 2,686,822 | Evans et al. | Aug. 17, 1954 |

FOREIGN PATENTS

| 152,848 | Germany | July 4, 1904 |
| 569,186 | France | Jan. 6, 1924 |
| 671,171 | Great Britain | Apr. 30, 1952 |